Oct. 1, 1929.                J. K. KOSTKO                1,730,218
         SYNCHRONOUS MOTOR AND METHOD AND MEANS FOR OPERATING SAME
                           Filed Nov. 5, 1928
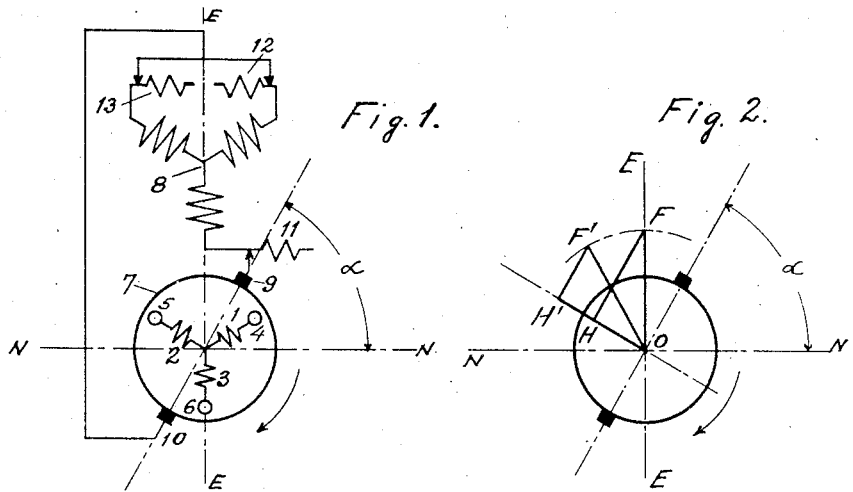
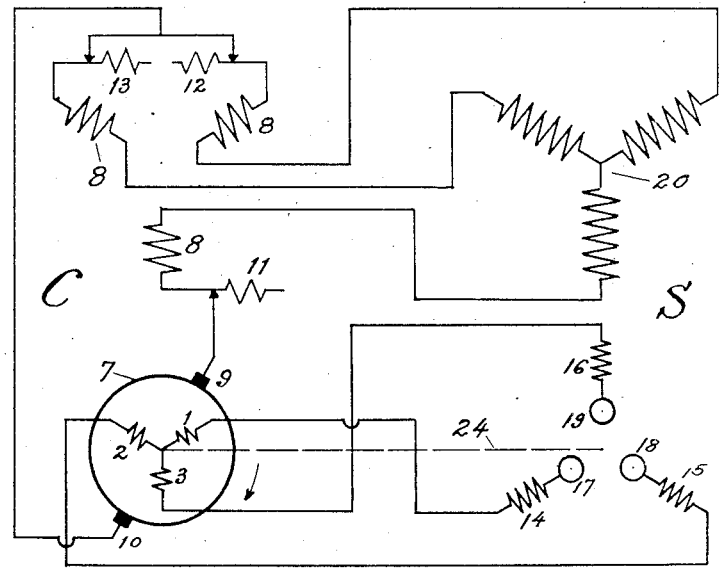
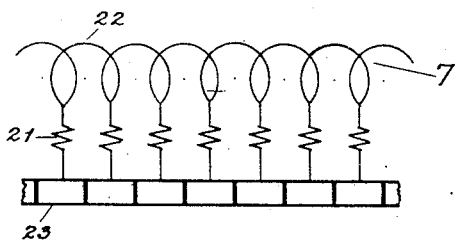
INVENTOR
Jaroslaw K. Kostko
BY
Charles F. Pindar
ATTORNEY Patented Oct. 1, 1929

1,730,218

UNITED STATES PATENT OFFICE

JAROSLAW K. KOSTKO, OF UNIVERSITY CITY, MISSOURI

SYNCHRONOUS MOTOR AND METHOD AND MEANS FOR OPERATING SAME

Application filed November 5, 1928. Serial No. 317,287.

My invention relates to synchronous motors, with particular reference to the synchronous-induction type and comprises an improved method of synchronizing and exciting these motors.

A synchronous-induction motor is structurally similar to an induction motor and is started as such; its secondary member carries a winding, usually of the polyphase type; during synchronous operation this winding is used as the field winding and is adapted to set up an unidirectional magnetization by a suitable grouping and connecting of its phase. These motors are usually excited from a source of constant D. C. voltage; but much higher maximum torque and better power factor conditions are obtained with this type of motor if the excitation, instead of remaining constant, is made to increase with the load. For brevity, synchronous motors possessing this property will be called "compounded". There are several methods and means of causing said excitation to increase with the load over a more or less extensive range of loads but it may happen that some preferred method of compounding cannot conveniently be used, for instance on account of the size of the motor or of high voltage of the supply. According to this invention I divide the total load between two or more synchronous motors coupled together, make the preferred method of compounding dependent on one only of these motors, derive the excitation of the other motor or motors from the source of excitation of the motor on which the selected compounding method is dependent, and proportion all parts in such a way that when the total load of the set increases the load taken by the compounding controlling motor increases. In this manner I cause the excitation of all motors to increase with the load over a range of loads and cause the set to operate as a single compounded motor.

If several synchronous motors are coupled together and act on a common load, a harmonious cooperation is obtained if the coupling means are such that the expression: (angular velocity) multiplied by (number of poles) and divided by (frequency of the supply) is the same for all motors; for brevity, motors so coupled will be called "mechanically coupled". The simplest case obtains when the motors are supplied with alternating currents of the same frequency and are mounted on the same shaft; they must then have the same number of poles.

If a set of mechanically coupled motors is made to act on a common load, these motors divide the load according to the characteristics of each motor and to the mode of supplying it with alternating current and with unidirectional exciting current; with these data on hand a person skilled in the art can predetermine the fraction of the total load taken by each motor. The invention applies to all cases in which the excitation of at least one of the motors increases with the load of said motor and in which the latter is so proportioned that its load increases when the total load of the set increases.

The objects and features of this invention will more fully and clearly appear from the description taken in conjunction with the accompanying drawings and will be pointed out in the claims.

In the accompanying drawings, Fig. 1 is a diagrammatical illustration of a self-excited compounded motor especially suitable for use in connection with this invention; Fig. 2 is an explanatory diagram; Fig. 3 is a diagram illustrating one embodiment of the invention; Fig. 4 shows the preferred construction of the source of excitation of the motor of Figs. 1 and 3. All motors are shown in their two-pole form.

It has been assumed in all figures that the primary winding is on the rotor and the secondary or field winding on the stator, although this arrangement is not essential and can be reversed.

The invention will be further explained in connection with the self-excited compounded motor described in the article "Self-exciting synchronous motor" published in the March 27, 1920 issue of the "Electrical World" (New York).

In Fig. 1, the primary winding 1, 2, 3 is shown as a three-phase star-connected winding adapted to be connected to the supply of alternating current by means of slip rings 4, 5 and 6. 7 is a commuted winding on the primary member and may be interconnected with the primary winding 1, 2, 3, but is preferably independent therefrom. 8 is the field winding shown as a three-phase star-connected winding supplied with exciting current from the commuted winding 7 by means of brushes 9 and 10 and connected in the manner disclosed by Danielson (U. S. Patent 694,092, page 1, lines 54–67). This Danielson connection gives a field directed along the axis E—E of the phase carrying the entire exciting current. Adjustable resistances 11, 12 and 13 may be used when starting as an induction motor and for adjusting the field strength during synchronous operation. As stated in the article mentioned above the line of brushes 9 and 10 makes with the neutral line N—N an angle $\alpha$ whose useful range is between 0 and 90 electrical degrees.

The motor is started as an induction motor. Furthermore, I found, and so stated in the above mentioned article, that the process of synchronizing these motors is entirely automatic, without any rush of current or mechanical stress, such as frequently occur during the process of synchronizing an ordinary separately excited motor.

The synchronous operation of the motor of Fig. 1 is as follows: The resultant air-gap flux is set up by the combined ampereturns of the field winding 8 and of the primary windings 1, 2, 3; it is well known that for any definite condition of load these latter ampereturns are substantially constant in magnitude and at standstill with respect to the secondary member. If the ohmic drop and leakage reactance drop in the primary winding be neglected then, with the constant applied voltage, the resultant flux must necessarily be constant in magnitude regardless of load; but the position of the axis of this resultant flux with respect to the secondary member changes as the load changes; the torque of the motor can be conceived as the action of this resultant flux either on the ampere-conductors of the secondary winding, or on those of the primary winding, these actions being, of course, equal in magnitude and opposite in direction.

Fig. 2 is the diagram of fluxes of the motor of Fig. 1. At zero torque the axis of the resultant flux OF is directed along the axis E—E of the field winding 8, for, in any other position its torque producing action on the ampere-conductors of the field winding would be different from zero. The D. C. voltage at the brushes is proportional to the component OH of OF perpendicular to the line of brushes; when a load is applied, the resultant flux remains constant in magnitude but moves against the direction of rotation of the rotor; for instance, at a certain load the resultant flux may be at OF' and the D. C. voltage at the brushes is then proportional to OH', greater than OH; thus, the exciting current is seen to increase automatically with the load over quite a range of loads.

In this specification a "self-excited synchronous motor" means quite generally a synchronous motor having a primary member carrying a commuted winding and a winding adapted to produce a flux which revolves with respect to this primary member; a secondary member carrying a winding adapted to set up a flux which is unidirectional with respect to this secondary member, and brushes cooperating with the commuted winding; and means for connecting these brushes to the winding on the secondary member. A compounded self-excited motor means a self-excited motor compounded either as described above, i. e. by setting the commutator brushes so that their axis makes with the axis of the unidirectional field set up by the secondary winding an angle less than 90 electrical degrees, or by causing its terminal voltage to increase with the load whereby the voltage at the brushes also increases with the load; or by a combination of these methods.

The compounded motor described above is entirely satisfactory for small outputs; but when an attempt is made to adapt it to a large output, it is found that the requirements of a well balanced mechanical design lead to dimensions of the commutator which are in excess of what is required for carrying the exciting current, and the motor becomes too expensive; moreover, the flux per pole in large motors is very considerable, and they are usually built for high voltages, commutation problems become serious and difficulties may arise from the fact that the commuted winding 7 is located on the same member and, usually, in the same slots as the high voltage primary winding. It is also found that in large sizes there is, sometimes, an excessive heating and wear of the commutator and brushes even when there is no sparking to be seen. This is mainly due to two causes: (1) the brushes shortcircuit coils of the commuted winding which are moving in a strong magnetic field; circulating currents set up in these coils superimpose themselves on the load current of the commuted winding and increase the current density under the brushes; (2) the resultant air-gap flux of the motor is partly due to the magnetomotive forces of alternating currents; it is well known that only the fundamental terms of these magnetomotive forces have the same number of poles as the motor and are at standstill with respect to the brushes; the harmonics, on the contrary, have different numbers of poles and are in a state of motion with respect to the brushes; they may cause unbalanced voltages in the multiple branches of the commuted winding and set up equalizing currents between the brushes of the same polarity in multipolar machines which further increase the current density under the brushes. I have found that, generally, any lack of symmetry in any winding on the secondary member, for instance in the field winding or in an amortisseur winding greatly favors the development of these harmful harmonics.

An embodiment of this invention overcoming these difficulties is shown in Fig. 3. It comprises a separately excited synchronous-induction motor S and a self-excited compounded synchronous motor C, both motors having the same number of poles and mounted on the same shaft 24. The polyphase primary winding 1, 2, 3 of C is connected in series with the primary winding 14, 15, 16 of S and through it to the source of supply by means of slip rings 17, 18 and 19. The exciting winding 20 of S, shown as a three-phase Danielson-connected winding is connected in series with the winding 8 of C, and through it to the brushes 9, 10. Resistances 11, 12, 13 may be used when starting the set as an induction motor or for the field strength regulation.

The primary and secondary windings of the elements S and C of the combination can be dimensioned and positioned in different ways. In one way of carrying out my invention I make the ratio of the number of primary conductors of S to the number of primary conductors of C the same as the ratio of the number of secondary conductors of S to that of C. Concurrently, I make the angular relation between the primary windings of the two motors the same as the angular relation between their secondary windings. Under these conditions and for any combination of primary and secondary currents at sub-synchronous or synchronous speeds, the resultant fluxes of the two motors are in a substantially constant ratio, their terminal voltages are in phase and also in a constant ratio, and their torques are in the same constant ratio as their terminal voltages. Thus, if the supply voltage is 1000 volts and the terminal voltages at no-load are 200 volts on C and 800 volts on S, then the terminal voltages maintain these same values for every load condition, and the total load is divided so that C carries 20%, while S carries 80% of it. Because of similarity of electrical conditions and proportionality of torques in the two motors the synchronizing performance of each is of the same nature as that of the self-excited motor of Fig. 1, and synchronizing is entirely automatic. In making these statements, the effects of saturation of iron, the ohmic and leakage reactance drops and the small reaction of the commuted winding 7 have been neglected.

It is seen that by this arrangement I can secure for S and for the combination as a whole the advantages of the compounding method shown in Fig. 1 while restricting the compounded-motor construction of Fig. 1 to a machine C carrying a fraction only of the total load of the combination.

Since the choice of the fraction of the total output assigned to the motor C is in the hands of the designer, it is usually possible to choose it so that the output of C is not too small for a motor of the same number of poles as in S; both motors can then be mounted on the same shaft, as in Fig. 3, and all connections between the corresponding windings of C and S made without any sliding contacts.

Self-excited motors of the type shown in Fig. 1 have been found to have the disadvantage that the increase of the exciting voltage from no-load to the maximum synchronous load is not sufficiently great when the leading current component is given satisfactory value at no-load. This disadvantage can be overcome in an embodiment of my invention similar to that shown in Fig. 3. It was shown that with primary and secondary windings proportioned and positioned to maintain the terminal voltage of each motor constant the resultant flux of C remains constant in magnitude, and the change in magnitude of the voltage at the brushes 9, 10 is due only to a displacement of the axis of this constant flux as the load varies. In another way the carrying out my invention I make the ratio of primary conductors of the two motors so different from the ratio of their secondary conductors, or and make the angular relation between the primary windings of the two motors so different from the angular relation between their secondary windings as to cause the voltage across C to increase over a range of loads as the total load increases. The increase of the voltage at the brushes 9, 10 is then due not only to the change of location of the axis of the resultant flux of C, but also to its increase in magnitude corresponding to the increasing terminal voltage. For instance, in the example given above the windings may be so proportioned and located that at no-load the terminal voltage of C is 150 volts, while at the point of maximum torque it is 250 volts; the improvement of the torque conditions due to the increased maximum excitation will more than compensate for a tendency towards reduction of the torque of S caused by the decrease of its terminal voltage from something more than 850 volts to something more than 750 volts.

If S is wound for a high voltage, transformers can be interposed between the primaries of S and C without destroying the series characteristic of the connection of Fig. 3; suitably connected transformers can also be used if it is desired to wind C and S for different numbers of phases. It is not necessary to have the same connection of primary winding on both motors; one may be star-connected, the other delta-connected, etc. In this specification and in the claims a series connection between two windings carrying alternating currents means, quite generally, a connection in which the ratio of ampere-conductors of these windings remains substantially constant through the entire range of the synchronous operation of the motors.

It is convenient to have the secondary windings of C and S connected in series, as shown in Fig. 3, especially for starting and synchronizing the set; but this connection is not essential to the invention; at synchronism both windings can be connected in parallel across the brushes 9, 10; at starting one of them—preferably that of the larger motor—may be provided with adjustable resistances; the other may be either closed on the brushes with or without interposition of resistances, or left open, or shortcircuited upon itself, as the case may be.

In Figs. 1 and 3 the brushes 9, 10 are conventionally shown as bearing directly on the commuted winding 7; but in practical construction the brushes always bear upon a commutator connected to the commuted winding. Fig. 4 shows the preferred arrangement of connections between the commutator and the commuted winding. I found that a good way to prevent circulating currents in coils short-circuited by the brushes and in conductors connecting brushes of the same polarity in multipolar machines is to use connections of some high resistance material 21 between the coils 22 of the commuted winding 7 and the commutator segments 23. Such connections diminish the circulating currents and make it possible for the energy of the reduced currents to spend itself harmlessly.

It is seen that in my combination of a compounding controlling motor and a separately excited motor each has the characteristic of a compounded motor so long as the two cooperate as shown and described; but if the separately excited motor is operated without the other then it has no compounding characteristic, whereas the compounding controlling motor has such a characteristic whether operated by itself or in conjunction with the separately excited one.

While my invention has been more particularly described and illustrated in connection with the compounding means shown in the article mentioned above, the invention can be used with any compounding means just so the means used are made dependent on one of the two cooperating synchronous motors. For instance, I can connect the primaries of the two mechanically coupled motors S and C in parallel, provide a source of constant D. C. voltage, connect same to supply current to secondary windings of both motors and provide an adjustable resistance under control of the current taken by one of the motors and arranged to increase the ampereturns in each of the secondary windings with increasing load on the motor carrying the controlling current.

What I claim is:—

1. The method of operating two mechanically coupled synchronous motors, comprising, causing each motor to carry a fraction of the total load, causing the load carried by one motor to increase as the total load increases, producing unidirectional ampereturns on the secondary of each motor, and making the magnitude of these ampereturns so dependent on the load of the motor the load on which increases with the total load as to cause said ampereturns to increase with increasing total load over a range of loads.

2. The method of operating two mechanically coupled synchronous motors, comprising, causing one motor to carry a greater fraction of the total load than the other, causing the load carried by the motor carrying the smaller load to increase as the total load increases, producing unidirectional ampereturns on the secondary of each motor, and making the magnitude of these ampereturns so dependent on the load on the motor carrying the smaller load as to cause said ampereturns to increase with increasing total load over a range of loads.

3. The method of operating two mechanically coupled synchronous motors, comprising, causing each motor to carry a fraction of the total load, causing the voltage at the terminals of one motor to increase as the total load increases, producing unidirectional ampereturns on the secondary of each motor, and making the magnitude of these ampereturns so dependent on the load of the motor the terminal voltage of which increases as to cause said ampereturns to increase with increasing total load over a range of loads.

4. The method of operating two mechanically coupled synchronous motors, comprising, causing each motor to carry a fraction of the total load, producing from the primary of each motor an alternating current magnetization stationary with respect to its secondary, producing on the secondary of one motor unidirectional ampereturns setting up a magnetization at an angle to the alternating current magnetization stationary with respect to said secondary, producing on the secondary of the other motor unidirectional ampereturns setting up a magnetization at a different angle to the alternating current magnetization stationary with respect to said second secondary, and making the magnitude of both unidirectional ampereturns dependent on the load of one of the motors.

5. In combination two mechanically coupled synchronous motors, each adapted to carry a part of the total load, each motor having a primary and a secondary winding, means for connecting both primary windings in series relation and to the supply, a commuted winding on the primary of one of the motors, brushes cooperating with said commuted winding and connected to supply current to both secondary windings, said brushes being positioned along an axis displaced from the perpendicular to the axis of the secondary winding of the motor provided with the commuted winding.

6. In combination two mechanically coupled synchronous motors, each adapted to carry a part of the total load, each motor having a primary and a secondary winding, means for connecting the primary windings to the supply, a commuted winding on the primary of one of the motors, brushes cooperating with said commuted winding and connected to supply current to both secondary windings, said brushes being positioned along an axis displaced from the perpendicular to the axis of the secondary winding of the motor provided with the commuted winding.

In testimony whereof I affix my signature this 31st day of October, 1928.

JAROSLAW K. KOSTKO.